United States Patent [19]

Snopko

[11] 3,934,262

[45] Jan. 20, 1976

[54] VIDEO DISC AND METHOD OF PLAYBACK

[75] Inventor: Paul A. Snopko, Chicago, Ill.

[73] Assignee: Zenith Radio Corporation, Chicago, Ill.

[22] Filed: July 2, 1974

[21] Appl. No.: 485,194

[52] U.S. Cl. .................................................. 358/4
[51] Int. Cl.² .......................................... H04N 5/76
[58] Field of Search ................ 358/4, 8; 178/6.6 DD

[56] References Cited
UNITED STATES PATENTS

| 3,663,743 | 5/1972 | Dann | 358/8 |
| 3,761,604 | 9/1973 | Ozawa et al. | 358/4 |
| 3,796,825 | 3/1974 | Redlich et al. | 178/6.6 DD |
| 3,852,520 | 12/1974 | Bruch | 358/4 X |

FOREIGN PATENTS OR APPLICATIONS

| 1,562,038 | 7/1970 | Germany | 178/6.6 DD |

*Primary Examiner*—Richard Murray
*Assistant Examiner*—Mitchell Saffian
*Attorney, Agent, or Firm*—John J. Pederson; Cornelius J. O'Connor

[57] ABSTRACT

An optical video disc has a multi-turn spiral track which stores a frequency modulated carrier modulated with program information in accordance with NTSC format. The recording is further characterized by the fact that the phase of the chroma subcarrier at the start of one convolution of the record track is substantially the same as that of the end of the convolution. In the playback process, the disc is rotated at a speed such that the chroma subcarrier is integrally related to the frequency of disc rotation.

5 Claims, 5 Drawing Figures

3,934,262

VIDEO DISC AND METHOD OF PLAYBACK

BACKGROUND OF THE INVENTION

In the optical player a reading beam scans a spiral track of a video record, such as a disc, to derive the program information. Most frequently the information is stored in the disc under the control of a carrier signal that is angle-velocity-modulated (frequency modulated) with luminance information and with a subcarrier signal that is amplitude and phase modulated with chroma information. The sound information of the program is conveyed by one or more audio modulated subcarriers also used in preparing the record disc and the position of these various signals within the frequency spectrum is subject to choice. That choice is customarily made for optimum conditions of recording and playback. One may, for example, transcode the signals so that their frequency assignments are related to, but specifically different from that of the NTSC color signal specifications. As the art has developed, it has become possible to record the program in the NTSC format. This is especially desirable where the character of the playback apparatus is such that the carrier signal modulated by program information may be derived from reading the disc with such precision that it may be utilized directly, obviating the need for further signal processing or transcoding.

In order to be able to use the output signal of the playback apparatus without further signal processing or transcoding, it is necessary that timing errors, attributable for example to eccentricities of the disc, be compensated and maintained within an allowable tolerance range. Timing errors, when experienced, adversely affect both the luminance and chroma information but there is considerable more latitude with respect to the former than the latter. In point of fact, deficiencies in chromaticity of the reproduced image are manifest if the phase error of the chroma subcarrier is in excess of approximately 10 nanoseconds. Compensation of timing errors is accomplished by a correction system controlled to displace the reading beam tangentially of the reading point in the sense and amount required for compensation. Manifestly, the requirements of the timing correction system are exacting if the compensation is to be accomplished with the precision necessary to maintain phase coherence of the chroma subcarrier signal.

Applicant has devised a phase locked servo-type of timing correction system that satisfies the precision requirements and yields an output signal in which the luminance information is corrected for timing errors and in which the chroma information has adequate phase coherence for use by a color receiver. Such a servo system makes it possible to play back a video disc with little, if any, difficulty if the recording is uninterrupted from a starting point to the finish. Some difficulty will be experienced, however, in intervals of stop frame reproduction which, from a practical standpoint, is a unique and especially attractive attribute of the optical video disc and playback arrangement. This difficulty is inherent in the NTSC signal specifications which prescribe that the chroma subcarrier signal correspond to an odd multiple of one-half the line scanning frequency. Because of that frequency relation, the phase of the chroma subcarrier signal changes 180° from line-to-line as well as from frame-to-frame. As a consequence, during stop frame operation when the reading beam returns from the end of an image frame to the beginning of that frame, the phase of the chroma signal monitored by the phase locked servo system undergoes an abrupt excursion of 180°. This renders the servo unstable and the operation of the playback device becomes imperfect.

Accordingly, it is a principal object of the invention to accommodate video playback systems to those characteristics of the NTSC format that otherwise may impair the performance of the playback arrangement, especially during intervals of stop frame.

It is a specific object of the invention to afford such accommodation where the playback features a phase locked servo-type of timing correction system.

SUMMARY OF THE INVENTION

Practice of the subject invention requires departure from past practices both with respect to the video disc and its method of playback.

A video disc, in accordance with the invention, stores an angle-velocity-modulated carrier signal modulated by luminance, chroma and synchronizing information arranged as to amplitude, phase and frequency in accordance with NTSC color signal specifications. The two interlaced image fields constituting a single image frame occupy approximately, but not precisely, one revolution of the storage track of the disc. The disc is further characterized by the fact that the phase of the chroma subcarrier at the start of one convolution of the storage track is substantially the same as that at the end of such track convolution, that is to say, 360 rotational degrees following the start of the convolution. In the playback process the speed of the rotation of the disc is selected to the end that the chroma subcarrier frequency is integrally related to the frequency of disc rotation. This means that the disc rotational speed is slightly different from that which is otherwise normally employed, preferably it is increased slightly to achieve the desired phase conditions to accommodate stop frame.

BRIEF DESCRIPTION OF THE DRAWINGS

The features of the invention which are believed to be novel are set forth with particularity in the appended claims. The invention, together with further objects and advantages thereof may best be understood by reference to the following description taken in conjuction with the accompanying drawings in which similar reference characters identify the same component parts and in which:

DESCRIPTION OF THE PREFERRED EMBODIMENT

Figure 1:
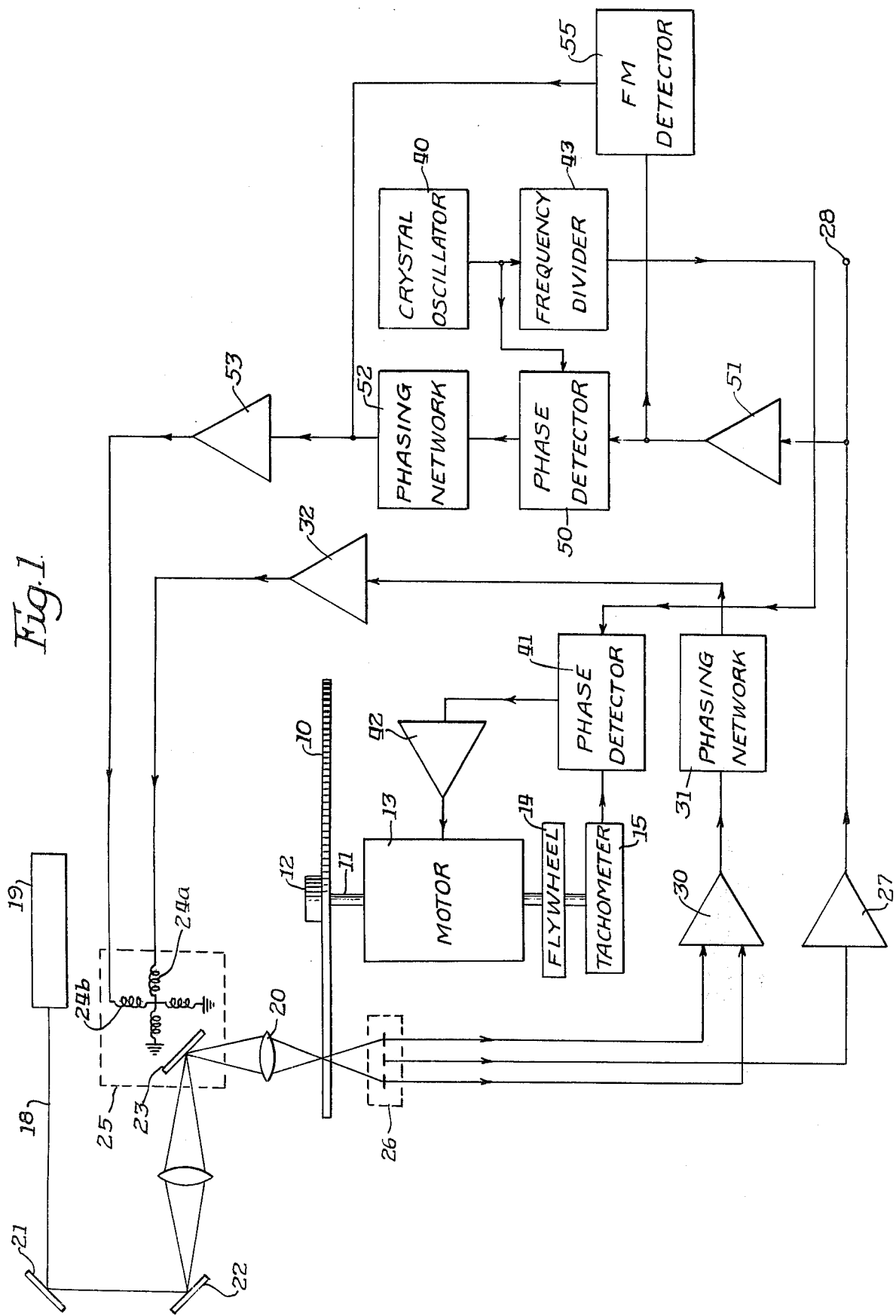
FIG. 1 is a schematic representation of a video playback system which may employ the disc and playback process of the subject invention.

The playback system of FIG. 1 reads information stored in a record carrier or video disc 10 of suitable material, such as polyvinyl chloride, which has the capability of storing program information. The information is carried in a multi-turn spiral shaped track that may be cut mechanically into the surface of the disc or may be chemically inscribed under the influence of a laser beam controlled by one or more signals that convey the program information. For the preferred case, a laser beam records the program in NTSC format in order that reading of the disc may directly produce a carrier signal modulated by a program in accordance with NTSC format for utilization without the need for further signal processing or transcoding. Accordingly, the laser beam is controlled in a recording process by a carrier signal that is angle-velocity-modulated (frequency modulated) with a video program having such format and comprising luminance components, a subcarrier that is amplitude and phase modulated with chroma information, synchronizing and audio components. The NTSC signal specifications further include a burst of the chroma subcarrier during retrace intervals to be utilized in regenerating a chroma demodulating signal in color receivers and that burst, which has a fixed phase relative to the chroma subcarrier, may likewise be employed as a pilot signal in the phase locked timing correction arrangement of the playback system to be considered in more detail hereinafter. Alternatively, the laser is further controlled in the recording process by a continuous wave pilot signal, either as a modulation component of the frequency modulated carrier or as a separate modulating signal of a preselected frequency operating on the laser beam. The latter facilitates isolation of the pilot from the other stored information and for the same reason its frequency may advantageously be chosen to equal one-half that of the chroma subcarrier.

Both mechanical and chemical methods of disc fabrication are known but neither constitutes any portion of the present invention and therefore there is no need for further elaboration other than to say that the recorded information constitutes a spatial representation of the frequency modulated carrier wave and other signals employed in storing the program on the record. By way of illustration, the FM carrier may have a deviation rang of 6.6 to 8.6 MHz; the chroma subcarrier frequency may be 3.58 MHz and the continuous wave pilot signal may have a frequency of 1.79 MHz. Another set of frequencies that have been successfully utilized include an FM carrier range of 7.8 to 9.8 MHz and a pilot signal of 3.06 MHz. If desired, the pilot carrier may have a frequency value of twice the frequency of the chroma subcarrier. In all cases the pilot amplitude is in the range of 5–10% of the frequency modulated carrier.

As thus far described, the disc conforms to the practices of the prior art but, in accordance with the invention, departures from prior practices are made in order to facilitate continuity of phase, especially of the chroma subcarrier in intervals of stop frame. More particularly, the speed at which the master disc is rotated while information is being recorded is modified in order that the phase of the chroma subcarrier at the start of one convolution of the record track is substantially the same as that at the end of such convolution. This may be achieved, as described in connection with the disc driving arrangement of the playback apparatus, by selecting a rotational speed such that the frequency of the chroma subcarrier is an integral multiple of the frequency of disc rotation. With this change in the recording process the two interlaced image fields that constitute a single image frame in the NTSC format occupy approximately, but not precisely, one revolution or convolution of the spiral storage track of the record. In the preferred case where the recording speed is increased slightly to achieve the described phase relations of the chroma subcarrier at the start and finish of a revolution, slightly more than one disc revolution is required to record a single frame. More particularly, the time for recording the single image frame equals the time of a single revolution of the disc plus an increment corresponding to an odd half multiple of the chroma subcarrier period. Where the pilot signal is the same as, or an integral multiple of, the chroma subcarrier, the added increment corresponds to one half-cycle of the chroma subcarrier. On the other hand, where the pilot frequency is half the chroma subcarrier frequency, the increment corresponds to three half-cycles of the chroma subcarrier. Expressed differently, where the pilot frequency is less than the chroma subcarrier, say half of it, it is necessary that the rotational frequency of the master during recording be an integral multiple of both the chroma subcarrier and the pilot frequency.

The disc may be of sufficient thickness to be mechanically rigid in which case it is supported on a turntable in the playback apparatus and the disc is provided with a coating, usually metallic, to operate in the reflective mode. Alternatively, and as indicated in the drawing, the disc may be sufficiently thin to be flexible in which case it is supported by a spindle 11, retained in position by a removable cap 12 and driven by a motor 13 having a speed controllable in response to an applied signal. The motor rotates the spindle and disc at a relatively high speed, of the order of 1800 rpm, to accomplish what is referred to as flying the disc. The motor has a flywheel 14 and also a tachometer 15, the latter serving to develop a signal representative of the instantaneous angular position of the motor and necessary to the actuation of a phase loop servo system, presently to be described, which exerts a precise control on the motor speed. Since the record track is a spatial representation of the stored signal complement, reading of that track with a laser or light beam permits photoreceptors to respond to beam in the reading process and develop a corresponding complement of electrical signals for utilization.

Reading of disc 10 to develop electrical signals conveying the stored information additionally requires a reading beam 18 developed by a laser source 19 which projects a beam of mono-chromatic coherent light along a path to a final or focusing lens 20 which focuses the reading beam onto the storage track of disk 10. The physical relationship of source 19 to lens 20 is of no particular moment since the light path is easily determined by mirrors, such as stationary mirrors 21 and 22 and a movable mirror 23 positioned properly to present the reading beam to focus lens 20. Mirror 23 is selectively displaceable along orthogonal axes by a driver energized by tracking correction signals to maintain the reading beam in optimal tracking relation to the disc.

One type of adjustment of mirror 23 results in displacement of the reading beam in a selected sense and controlled amount radially of the storage track. This is to maintain the beam centered in the track and correct for radial tracking errors that are frequently encountered. The remaining type of displacement is likewise of selected sense and controlled amount tangentially of the storage track to compensate timing errors that are likewise frequently encountered. For the most part, they represent eccentricities in the disc and occur at frequencies in the range from 30 to 120 Hz, being multiples of the disc rotational frequency. Mirror 23, its mechanical support and the means, responsive to applied error correcting signals for adjusting the position of the beam relative to the track of the disc, may conveniently be of the type described and claimed in copending application Ser. No. 456,918, filed Apr. 1, 1974 in the name of Karl Wossidlo and assigned to the assignee of the present invention. This structure, at least as to controlled displacement of mirror 23, is essentially an electromagnetic motor having one pair of windings 24a energized by a radial tracking correction signal and a second pair of windings 24b energized by a timing correction signal to control the position of mirror 23. Since, as described in the Wossidlo application, this whole arrangement may conveniently be constructed as a single subassembly, it is represented by broken line rectangle 25. The described arrangement constitutes means, including a reading beam adjustably supported for tangential and radial movement relative to the storage track of the disc, for deriving the pilot signal and the program modulated carrier signal during scanning of the disc.

In order to track the record and read out all segments thereof, it is necessary that the reading beam be moved continuously in a radial direction over the disc at the proper speed, assuming that the disc is to be read without interruption from start to finish of the track. This is accomplished by a carriage arranged to support lens 20, mirror subassembly 25, and a group of photoreceptors, presently to be described. Since the mechanism will be readily understood to those skilled in the art and since it constitutes no part of the subject invention, for convenience it has not been illustrated.

While a flexible disc may be used in the reflective mode, the system shown in the figure is predicated on the use of a transmissive disc and accordingly, a photoreceptor arrangement, represented by broken-line rectangle 26, is positioned to the side of record 10 opposite that from which the reading beam approaches the record. The photoreceptor usually includes a family of photocells disposed symmetrically with respect to a plane that is normal to the plane of disc 10 and tangential to the storage track at the point of the reading spot. For convenience, three photocells have been shown, the center one for deriving the radio frequency (RF) output of the playback system and the remaining two, symmetrically positioned to opposite sides of the first, are used for radial tracking servo purposes. the RF output is delivered through an amplifier 27 to an output terminal 28 and constitutes a carrier modulated by a program signal of NTSC format that may be used directly. Of course, it also includes the continuous wave pilot signal which may be filtered ahead of output terminal 28 should that be desired.

As thus far described, the system represents the present state of the art and its operation is well understood. Reading of disc 10 by beam 18 as the disc is rotated by motor 13 causes photoreceptor 26 to develop and supply to output terminal 28 a carrier modulated by an NTSC signal for utilization. Concurrently, the signal outputs of the radial tracking photocells of photoreceptor 26 are delivered through a differential amplifier 30 and phasing network 31 as well as a current amplifier 32 to energize coil pair 24a. The output of differential amplifier 30 is a radial error correction signal, designating the sense and extent of radial misregistration of reading beam 18 relative to the storage track of record 10. Its use in energizing coil pair 24a displaces mirror 18 about the appropriate one of its two axes of displacement in the proper sense and amount to maintain optimun radial tracking registration. This, too, is well understood in the art.

An explained above, it is necessary to compensate timing errors attributable, for example, to eccentricities of the record, if the output signal is to be suitable for direct utilization. In particular, this signal must exhibit phase coherence of the chroma subcarrier which imposes exacting specifications on the timing error correction system since phase errors in excess of about 10 nanoseconds can hardly be tolerated without manifesting errors of chromaticity in the reproduced image. The illustrated system is a phase locked timing correction system which is capable of maintaining phase coherence of the chroma subcarrier and in accomplishing that will, at the same time, effect any necessary timing correction of the luminance information. The system for timing error compensation comprises a crystal controlled oscillator 40 for developing a phase reference signal. One output derived from the crystal oscillator is supplied to a first phase detector 41 which also receives the signal output of tachometer 15 and in response to the applied signals develops a phase correction signal supplied through amplifier 42 to speed control circuitry of motor 13 to phase synchronize the motor with the phase reference from oscillator 40. Of course, the signal inputs to detector 41 should have constant amplitude and therefore may be supplied through limiting circuits. Additionally, the signals to be compared in the phase must be of like frequency and therefore the signal input from crystal oscillator 40 is derived through a frequency divider 43. The specifics of the divider and the frequency of revolution of disc 10 will be considered more particularly hereinafter. Tachometer 15 generates a signal whose frequency is proportional to the angular velocity of the motor. Depending on the characteristics of motor 13 it may also be desirable to include a phase shaping network in the described motor control servo. This servo system, by maintaining motor 13 in phase synchronization with the phase reference from crystal 40, reduces the possible sources of timing error pretty much to those ascribed to the record itself.

Having provided phase synchronization for the driving motor, timing correction is then accomplished by a second phase locked servo comprising a second phase detector 50 which is responsive to the pilot signal derived from the record and to the phase reference signal to develop and to apply to coil pair 24b of the subassembly 25 a phase timing correction signal to phase synchronize the derived pilot signal with the phase reference. The phase reference to detector 50 is derived from crystal oscillator 40 with or without frequency division depending on the specific frequency relations of the system. The continuous wave pilot signal derived from reading the record is delivered through amplifier 51 that is selective to the frequency of the pilot. In addition to accomplishing frequency selection of the pilot, amplifier 51 may also have limiting properties so that the pilot is supplied to detector 50 with constant amplitude. The output of detector 50 is a timing correction signal supplied to coil pair 24b through a phasing network 52 and an amplifier 53. The phasing network is of course necessary because of the transducer frequency response properties of the electromagnetic motor which accomplishes controlled displacement of mirror 23. Since the timing correction system is a phase locked loop with a relatively narrow passband and a much better signal-to-noise ratio than obtainable with conventional frequency modulation systems, sufficient loop gain may be employed to achieve timing correction of the order necessary for developing at terminal 28 an output signal of NTSC format suitable for direct utilization after demodulation. So long as the reading of the disc is continuous and uninterrupted, the phase locked loop including detector 50 will maintain not only timing correction of the luminance information but also sufficient timing correction of the chroma subcarrier that the chroma components of the output signal have the required degree of phase stability.

While the phase locked servo is effective in maintaining phase stability as described, it is subject to losing its control function particularly if the operation of the playback device is interrupted. This, of course, may be expected because one of the attributes of the optical system is that the consumer may very readily pick and choose as between the frames of the stored program that are to be viewed, so-called skip-frame viewing. The same narrow pass band which permits the phase locked servo, once locked in, to correct timing errors so effectively makes it difficult to obtain lock when the frequency error is too high. In accordance with the teaching of Robert Adler, which is disclosed and claimed in copending application Ser. No. 475,738, filed June 3, 1974, a frequency modulation detector 55, responsive to frequency changes in the derived continuous wave pilot or color burst signal, develops a velocity correction signal for application to coil pair 24b to maintain the frequency of the derived pilot signal within the operating range of the phase locked servo system. Detector 55 receives the derived pilot signal from frequency selective amplifier 51 and, in response to changes of its frequency relative to its reference value develops a signal of appropriate polarity and amplitude for application through amplifier 53 to coil pair 24b. The effect of this velocity correction signal is to restore the frequency of the pilot to its desired nominal value and when that has been accomplished the phase locked servo loop including phase detector 50 will lock and maintain control of timing to compensate timing errors as described above. During operating intervals in which the phase locked loop is effective, there is essentially zero output from FM detector 55 and therefore while that detector serves the desired purpose of keeping the system within the pull-in range of the phase locked loop, during conditions when that loop has assumed control the FM detector has no influence on the timing compensation.

Were it not desirable to afford to the user the stop frame feature, the playback arrangement of FIG. 1 as described is totally effective for playing back video records. The utility of the playback is enhanced by practicing the subject invention, both through the unique characteristics of the video disc and the uniqueness of the playback especially as to the frequency of rotation of the disc, to avoid phase disruptions in stop frame that may otherwise cause the phase locked servo loop to become unstable. More particularly, it is required that the speed of rotation of the disc in play back be the same as that in record to take advantage of phase coherence of the chroma subcarrier even during stop frame which is made possible by the unique properties of the disc. Accordingly, the reference signal supplied from oscillator 40 to phase detector 41 is chosen to satisfy the requirement that the chroma subcarrier frequency (represented by crystal oscillator 40) is integrally related to the frequency of revolution of the disc. By way of example, if the chroma subcarrier signal has a value of 3.57954 MHz, and the pilot carrier is half the frequency of the chroma subcarrier, the preferred rotational frequency of the disc is equal to $$\frac{3.57954 \text{ MHz}}{525 \times 226} = 30.168942 \text{ Hz.}$$

Driving disc 10 at such a speed presents phase conditions at the start and finish of a single disc revolution, or at the start and stop of a single convolution of the record track, that are compatible with stop frame operation in that the phase of the subcarrier at those terminal points of a disc revolution or a track convolution is essentially the same; indeed, the 180° shift in phase that would be experienced in stop frame with conventional video discs and video playback speeds is avoided.

Figure 3A:
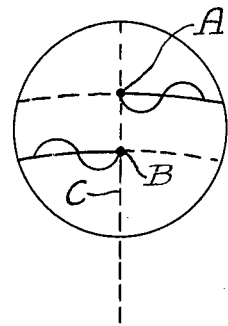
FIGS. 3a and 3b are enlargements of elemental segments of the spiral tracks on the discs of FIGS. 2a and 2b, respectively.
Figure 2A:
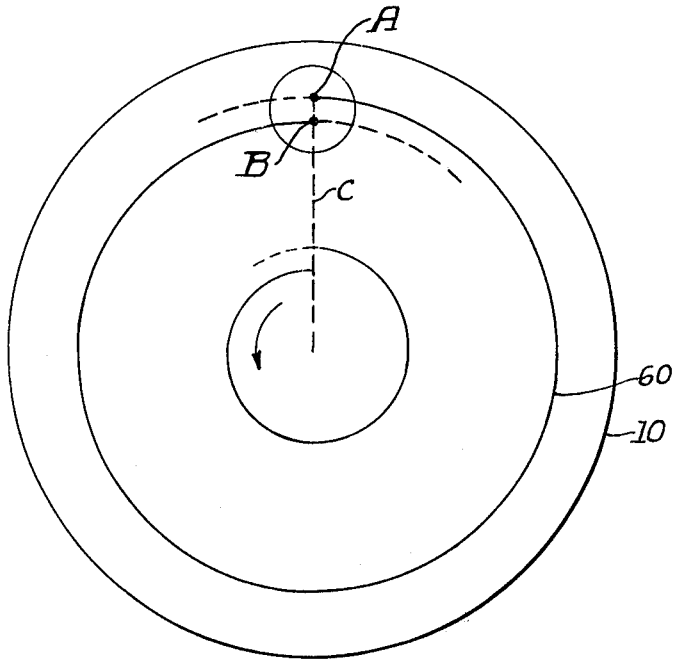
FIGS. 2a and 2b represent video discs in accordance with past practices and in accordance with the present invention, respectively, but exaggerated in scale in order to illustrate the subcarrier phase conditions.

A particular set of phase conditions will be readily understood by reference to the explanatory illustrations of FIGS. 2a–b and 3a–b. FIG. 2a represents a disc 10 of the prior art in which the information is stored in a multi-turn spiral but only one revolution 60 of the spiral is shown. Assuming the direction of rotation to be as indicated by the arrow a single picture frame commences at the point A and concludes at point B and these points are aligned along a radius C of the disc. They indicate the location of the synchronizing components which, as well known, are radially aligned in the video disc of conventional format. An enlarged view of the segment of the disc including both A and B is depicted in FIG. 3a. A single cycle of the chroma subcarrier is superimposed on the included segments of the single revolution of the storage track and it is clear from inspection that the phase of the chroma subcarrier at point A is 180° different from that at point B. That is the reason that stop frame of the prior art wherein the reading head skips from point B abruptly to point A confronts the phase locked servo loop with an abrupt phase change of 180° resulting in instability of the servo system.

Figure 3B:
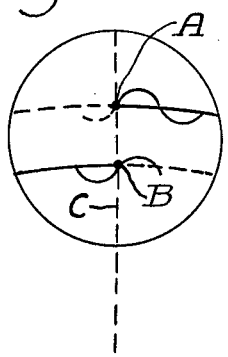
Figure 2B:
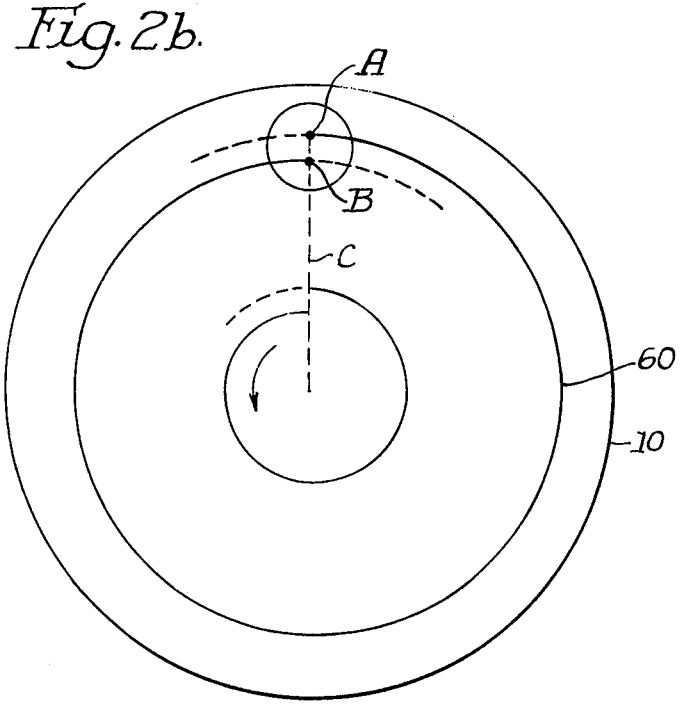

By way of contrast, points A and B having the unique properties taught by the present invention do not fall along the same radius of the disc because the time of a single frame corresponds to one revolution of the disc, or one convolution of the storage track, plus an increment corresponding to an odd number of half cycles of the chroma subcarrier. The phase consequences indicated in the enlargement of FIG. 3b are for the cases in which the chroma subcarrier and the pilot frequencies are integrally related; specifically, they are the same. As there shown, the chroma subcarrier is in phase at point A and at the completion of so much of the single image frame as is included within the one complete revolution or convolution of the storage track. With these phase conditions, the displacement of the reading head in stop frame presents essentially the same phase; certainly an approximate continuation of phase in that the phase change, if any, is well within the pull-in range of the phase locked servo. Accordingly, stop frame is accommodated with no instabilities in the timing correction system.

It will be appreciated that whereas the synchronizing components are radially aligned in disc structures of the prior art, where the present invention is practiced the sync components fall along a spiral which advances or delays depending upon whether the disc rotational speed has been increased (the preferred mode) or decreased to achieve the desired phase relations in respect to the start and finish of a single image frame.

Of course, it is not possible to modify the phase of the chroma subcarrier in the record without concurrently introducing a phase change in the luminance information. The phase change in luminance, however, is well within the acceptance range of the color television receiver and corrections or compensation automatically take place so that there is no impairment of the luminance information of the reproduced image if the record has the characteristics described above and necessary in accordance with the invention to accommodate stop frame operation.

It will be observed that in practicing the invention the frequency of disc rotation in recording and in continuous playback is faster than the frame rate but the rotational frequency and the image frame frequency are the same during stop frame.

While there has been described particular embodiments of the present invention, it is apparent that changes and modifications may be made therein without departing from the invention in the broader aspects. The aim of the appended claims, therefore, is to cover all such changes and modifications as fall within the true spirit and scope of the invention.

What is claimed is:

1. A video disc having a multi-turn spiral track in which is stored an angle-velocity-modulated carrier signal modulated by luminance, chroma subcarrier, and synchronizing information arranged as to amplitude, phase and frequency in accordance with the NTSC color signal specifications,
   characterized by the fact that each convolution of said track contains two interlaced image fields constituting a single image frame with the chroma subcarrier being of substantially the same phase at the end and beginning points of all convolutions of said track,
   and further characterized by the fact that the phase of the chroma subcarrier is continuous throughout the track.

2. The method of palying a video disc having a multi-turn spiral track in which is stored an angle-velocity-modulated carrier signal modulated by luminance, chroma subcarrier, and synchronizing information arranged as to amplitude, phase and frequency in accordance with the NTSC color signal specifications, with each convolution of said track containing two interlaced image fields constituting a single image frame, with the chroma subcarrier being of substantially the same phase at the end and beginning points of all convolutions of said track, and with the phase of the chroma subcarrier being continuous throughout said track, which method comprises rotating the disc at such speed that the frqequency of the chroma subcarrier is integrally related to the frequency of disc rotation.

3. The method in accordance with claim 2 in which the speed or rotation of the disc is selected of such value that reading a complete image frame of the program requires one revolution of the disc plus or minus an increment corresponding to an odd number of half cycles of the chroma subcarrier.

4. The method in accordance with claim 3 in which reading a single frame of the program requires the time of one revolution of the disc plus an increment corresponding to one-half cycle of the chroma subcarrier.

5. The method in accordance with claim 2 in which the rotational frequency of the disc is an integral multiple of both the chroma subcarrier frequency and the frequency of a pilot signal component included in the information recorded on the disc.

* * * * *